United States Patent

Troxel et al.

[11] Patent Number: 5,825,827
[45] Date of Patent: Oct. 20, 1998

[54] DYNAMICALLY COMPENSATED LINEAR REGULATOR FOR PULSED TRANSMITTERS

[75] Inventors: James R. Troxel, Glendale; Paul W. Schwerman, Phoenix, both of Ariz.

[73] Assignee: Honeywell Inc., Minneapolis, Minn.

[21] Appl. No.: 560,259

[22] Filed: Nov. 21, 1995

[51] Int. Cl.$^6$ .................................................. H04K 1/02
[52] U.S. Cl. ........................... 375/296; 375/312; 323/242
[58] Field of Search ..................... 375/295, 296, 375/297, 312; 455/431, 13.4, 505; 323/242; 377/25

[56] References Cited

U.S. PATENT DOCUMENTS 4,322,689  3/1982  Schucht .
4,812,686  3/1989  Morse .

FOREIGN PATENT DOCUMENTS 0609053  8/1994  European Pat. Off. .

OTHER PUBLICATIONS

WO 93 02407 A (Halcro Nominees) 4 Feb. 1993.
Brochure entitled "Mode S. Data Link Transponder" by Honeywell.

*Primary Examiner*—Wellington Chin
*Assistant Examiner*—Congvan Tran
*Attorney, Agent, or Firm*—Charles J. Ungemach; Brian C. Downs; Ronald E. Champion

[57] ABSTRACT

A system to alter the voltage supplied to the linear regulator of a pulsed transmitter in accordance with the temperature of the regulator, the minimum voltage required for a transmission and the specific aircraft installation requirements so as to reduce problems of heat dissipation in the regulator.

15 Claims, 2 Drawing Sheets

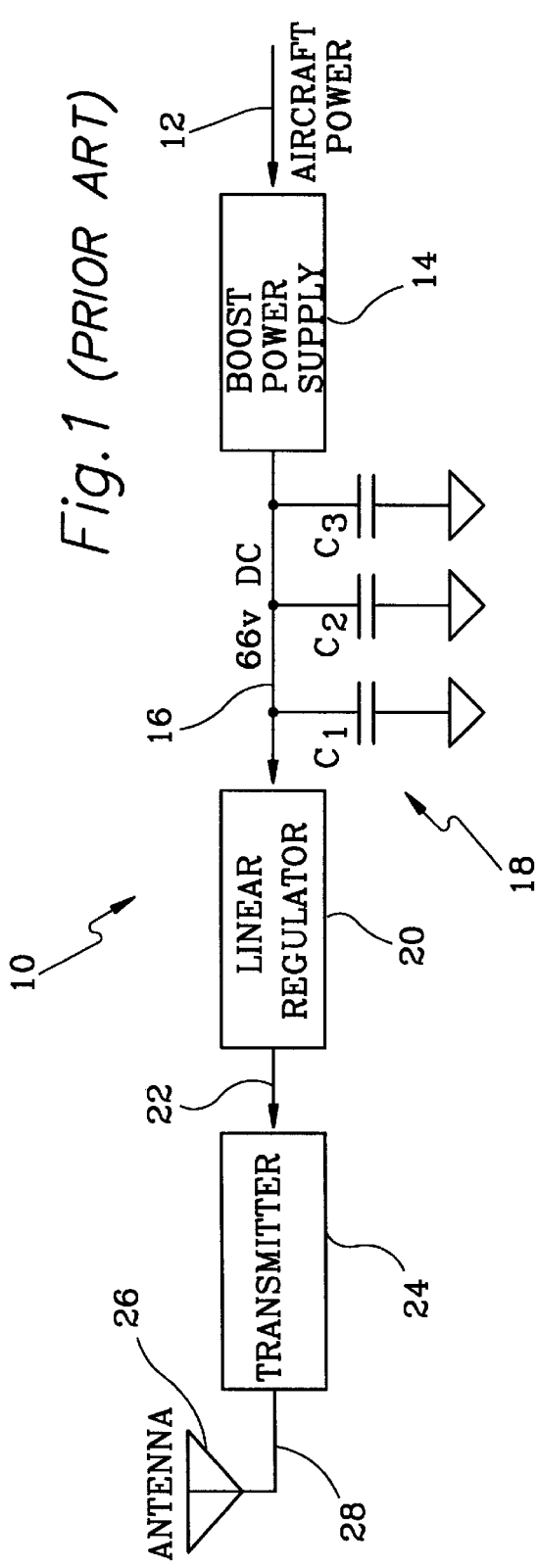
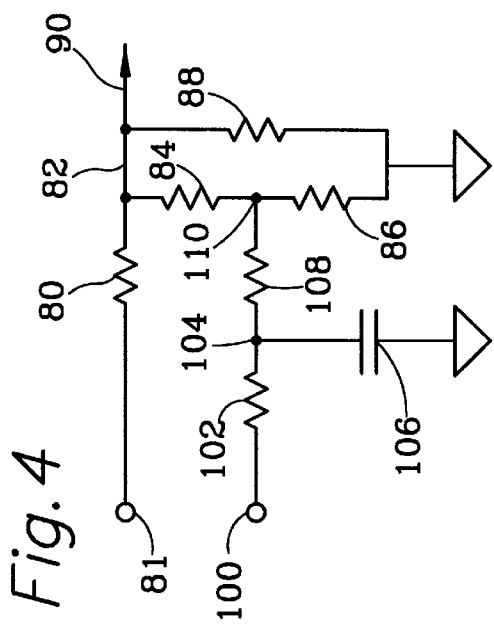
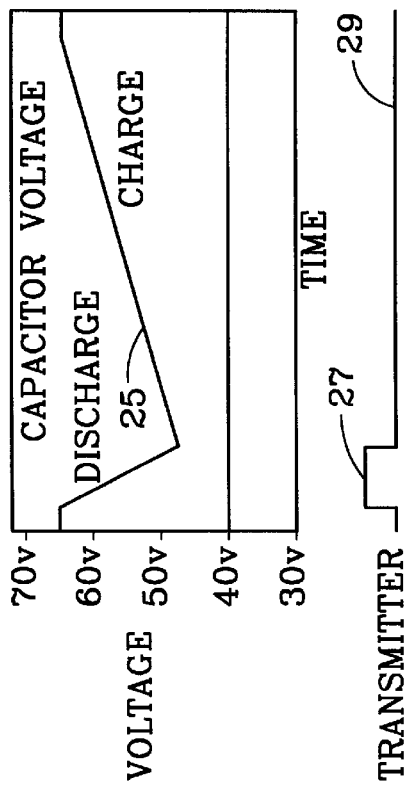

1

DYNAMICALLY COMPENSATED LINEAR REGULATOR FOR PULSED TRANSMITTERS

BACKGROUND OF INVENTION

1. Field of the Invention

The present invention relates to transmitters and more particularly to Radio Frequency (RF) pulsed transmitters which transmit at high power levels for short periods of time.

2. Description of the Prior Art

Air Traffic Control systems such as ATCRBS (Air Traffic Control Radar Beacon System) operate to monitor the positions of aircraft in a radar coverage area using Airborne Transmitters (Transponders) which transmit bursts of data with RF power levels of about 400 watts for time durations of approximately 15 microseconds. Newer Air Traffic Control systems such as Mode Select (Mode S) operate in conjunction with Traffic Collision Avoidance Systems (TCAS II) to provide more data than ATCRBS systems, and require transponders to transmit longer messages at the same power levels. Honeywell Inc. manufactures a Mode S Transponder unit for business and commuter aircraft which is identified as the XS-852. This system needs to be able to transmit bursts of data for approximately 120 microseconds. Newer Mode S Data Link Transponders such as the Honeywell Designed early engineering model XS-950 will need yet longer bursts of energy in order to provide Downlink Extended Length Messages (DELM). Such systems may require transmission bursts for 2150 or more microseconds.

Since the transmitters cannot instantly draw 400 watts from the aircraft power source during a transmission, a large capacitor bank is typically used to supply current to the transmitter and during transmission the capacitor voltage is allowed to drop while a linear regulator holds the voltage to the transmitter constant. During transmission, the regulator typically supplies about 50 amperes to the transmitter and the capacitor voltage drops from a nominal value of about 66 volts to a lower value dependent on the time of transmission and the value of the capacitance but does not drop low enough so that the transmitter's input supply is less than about 40 volts. The longer the transmit time, the more the voltage on the capacitor bank drops. The rate the voltage drops is proportional to the current drawn and inversely proportional to the capacitance. After transmission, the power supply recharges the capacitor bank at a much slower rate than the discharge.

The linear regulator output maintains the required 40 volts with an input which varies during transmission from 66 volts to about 46 volts and as such dissipates peak power levels of up to 1300 watts (50 amps×26 volts).

With the advent of the new longer transmission time requirements, problems are created in the power supply design. The choices have been 1) to increase the capacitance which creates the problem of taking up too much space and having too much weight or 2) to increase the voltage on the capacitors which creates the problem of requiring the linear regulator to dissipate more heat. These problems are made worse by operation in cold temperatures (the units must work at temperatures between −55 degrees centigrade and +70 degrees centigrade). At cold temperatures, the capacitor's capacitance is lowest and equivalent series resistance is highest, so a designer must increase the voltage on the capacitor to maintain performance requirements at cold temperatures (−55), which makes heat dissipation problems at high temperatures (+70) worse.

BRIEF DESCRIPTION OF THE INVENTION

The present invention allows the voltage on the capacitor bank to be dynamically controlled in accordance with the temperature and other variables by a microprocessor so that at hot temperatures, the voltage on the capacitor bank may be decreased to reduce the heat dissipation requirements and at cold temperatures the voltage may be increased to provide the required performance. This is accomplished in the preferred embodiment with a temperature sensor which operates through an A/D converter, a microprocessor and a D/A converter to increase and decrease the voltage supplied by the regulated power supply in accordance with temperature. The present invention is also operable to monitor the minimum voltage on the capacitor bank and to decrease it whenever it exceeds the required minimum and to monitor the specific aircraft installations so as to control the applied voltage in accordance with the required aircraft equipment capability (e.g DELM data link transmission capability).

BRIEF DESCRIPTION OF THE DRAWINGS

FIG. 1 is a block diagram of an air traffic control transponder system;

FIG. 2 is a graph showing the variation of voltage with time on the capacitor bank;

FIG. 4 is a schematic diagram of a portion of the power supply of the present invention.

DETAILED DESCRIPTION OF THE PREFERRED EMBODIMENTS

Figure 3:
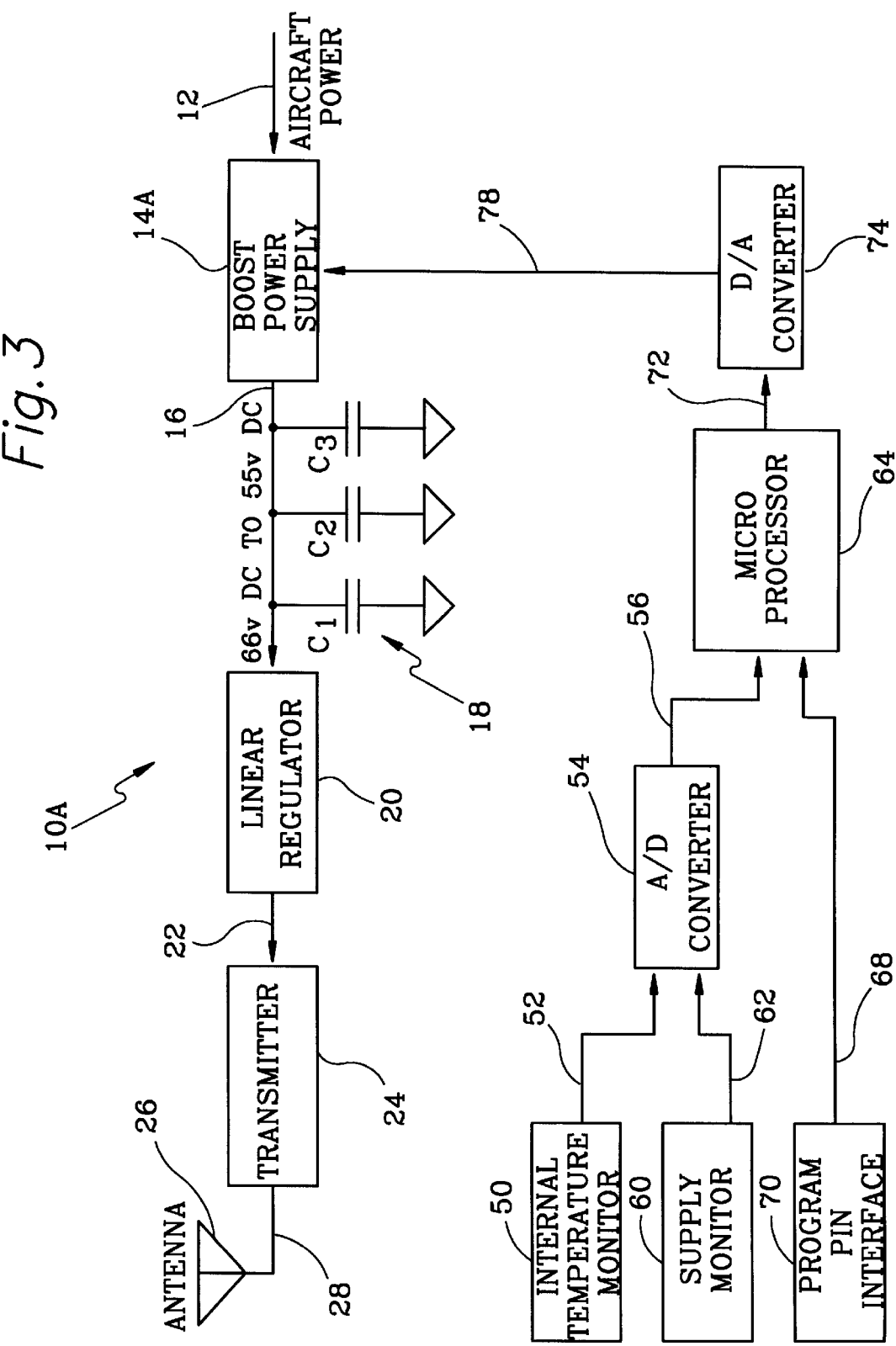
FIG. 3 is a block diagram of the present invention.

The present invention will be described in terms of an airborne aircraft traffic control transponder system with voltages and components consistent therewith. It should be understood that the principles of the present invention are applicable to any transmitting system which uses high power bursts for short periods of time. In FIG. 1, an air traffic control system 10, such as the above mentioned XS-950, is shown to comprise a source of power from the aircraft shown by arrow 12 (usually 115 volts ac or 28 volts dc) connected to a boost power supply box 14 which is operable to convert the 115 volt ac or the 28 volt dc power from the aircraft to provide a regulated source of about 66 volts dc on a line 16 for use by the system. A capacitance bank 18, shown consisting of three capacitors $C_1$, $C_2$ and $C_3$ is connected between line 16 and ground. The capacitance bank 18 is energized by the boost power supply 14 until a voltage of 66 volts is stored. The voltage on line 16 is presented to a linear regulator 20 which operates to produce a regulated voltage of about 40 volts on its output line 22 to the transmitter 24 shown connected to an antenna 26 by a line 28.

In operation, the transmitter produces short duration bursts of RF energy to provide communications concerning aircraft location and a limited amount of associated data. During these transmission times, the capacitance bank 18 discharges rapidly to a lesser voltage and then after transmission is more slowly charged back to the 66 volts as is shown in FIG. 2, wherein the voltage on the capacitance bank 18 is shown by graph line 25 as it varies with time. It is seen that when the transmitter is "on", as shown by the bump 27 in the time line 29, voltage drops from about 66 volts to about 46 volts and then when the burst is over, the voltage more slowly returns to the 66 volt level. In actual practice, with a worse case DELM reply, the bump 27 would represent about 2150 microseconds and the recharge time would be about 100 milliseconds. For non-DELM replies, the bump 27 would represent about 15 to 120 microseconds and the capacitor voltage would drop much less than shown in FIG. 2.

With the advent of requirements for the much larger transmission times (so as to allow greater information transmission and DELM transmissions), a great deal of difficulty has arisen because the designer has been forced to either increase the capacitance of the capacitor bank, increase the voltage on the capacitor bank or both. Increasing the capacitance creates the problem that the additional aluminum electrolytic capacitors take up a large amount of space on the printed circuit board (typically 3 square inches of board space each) and provides additional weight where weight and space are at a premium. Increasing the voltage to give the capacitance bank more discharge time before reaching the minimum allowable voltage (the transmitter herein requires 40 volts to operate) creates the problem of increasing the heat dissipation in the linear regulator. When it is realized that the system must operate at temperatures between −55 and +70 degrees centigrade, it is seen that in order to provide satisfactory performance for the worst case (−55 degrees centigrade when the capacitor performance is the poorest) the designer must sacrifice heat dissipation (which is the worst at 70 degrees centigrade).

The present invention alleviates the problems of the prior art by controlling the output of the power supply in accordance with temperature and other variables as will be seen in connection with FIG. 3. In FIG. 3, the elements having the same function as in FIG. 1 are shown with the same reference numbers. The aircraft power on line 12 inputs 115 volts ac or 28 volts dc to a modified boost power supply 14A. Boost power supply 14A supplies an output voltage on line 16 which will vary with the conditions from about 55 volts dc to about 66 volts dc as was used in connection with FIG. 1. The capacitance bank 18 is connected between line 16 and ground so that the voltage (55 volts to 66 volts) is stored in capacitors $C_1$, $C_2$ and $C_3$ for supply to the linear regulator 20. Linear regulator 20 supplies a constant 40 volts dc on a line 22 to the transmitter 24 connected to antenna 26 by a line 28. As in FIG. 1, transmitter 24 produces short bursts of transmission at high power levels but for modem DELM requirements, the bursts may be as long as 2150 microseconds or more. During the transmission bursts, the capacitance bank 18 discharges in a manner similar to FIG. 2 to a lower value and then, after the transmission, charges up to the desired voltage by the boost power supply 14A.

In order to overcome the problem of heat dissipation in the linear regulator 20, the voltage to the capacitor bank 18 is controlled in accordance with temperature, in accordance with the actual minimum voltage required for a transmission and in accordance with the specific aircraft installation. More specifically, at hot temperatures, the voltage on the capacitor bank 18 may be decreased to reduce the heat dissipation. In one design, the 66 volt supply was dropped to 61 volts without sacrificing performance. This amounted to a 20% power saving in the linear regulator and additional savings in the boost power supply. Further power savings may be accomplished by sensing the voltage on the capacitor bank on a dynamic basis after a DELM reply has been generated. If the voltage on the capacitor bank after the DELM reply exceeds the minimum +46V which is required at the input to the linear regulator, the voltage may be further decreased by the difference in the minimum voltage after the reply and +46V. For aircraft which do not require DELM reply capability, the capacitor voltage may be set to a low fixed voltage of about +55V, which saves additional power.

In FIG. 3, an internal temperature monitor 50 is shown operable to sense the internal temperature of the capacitor bank 18. The output of temperature sensor 50 is presented by a line 52 to an analog to digital converter 54 to produce a digital signal on a line or bus 56 which varies with the magnitude of the temperature sensed by monitor 50. FIG. 3 also shows a voltage supply monitor 60 which monitors the voltage on capacitor bank 18 and provides an output indicative of the voltage after a transmission i.e. the voltage at the bottom of graph line 25 of FIG. 2. If this voltage is higher than needed, the voltage presented to the capacitance bank 18 may be lowered to save more energy. The capacitance voltage signal is presented on a line 62 to the A/D converter 54 so that the output thereof on line bus 56 also has a component which varies with the capacitor bank voltage. A microprocessor 64 receives the digital outputs from A/D converter 54 which are indicative of the temperature and the capacitor bank voltage and also receives an input on a line 68 from a program pin interface sensor 70 which identifies the aircraft on which the transmitter is mounted and tells the microprocessor whether the higher requirements for DELM transmissions are needed or not. Knowing the temperature, the capacitor bank voltage and the requirements for DELM transmissions, the microprocessor determines (for example, with a look up table or a linear equation) the optimum voltage which the power supply 14A needs to produce and provides a signal indicative thereof on a line 72 to a digital to analog converter 74. D/A converter produces an analog signal indicative of the desired voltage and by a connection shown as line 78 provides this signal to the boost power supply 14A.

Boost power supply 14A includes an output voltage control circuit shown in FIG. 4. FIG. 4 shows a resistor 80, a first end of which is connected to the output line 16 of FIG. 3 at an input terminal 81. The second end of resistor 80 is connected to a junction 82. A pair of series connected resistors 84 and 86 and a resistor 88 connected in parallel therewith are connected between junction 82 and ground. The voltage at junction point 82 is presented to the boost power supply switching controller circuit (not shown) by a connection shown as arrow 90. The boost power supply switching controller circuit serves to increase or decrease the capacitor bank voltage which is presented at input terminal 81 so that the voltage on connection 90 is maintained at a constant voltage. As described so far, the magnitude of the resistors 80, 84, 86 and 88 are chosen so that the voltage on junction point 82 is approximately 3 volts when the voltage at point 90 is approximately 66V.

To provide the change of voltage at terminal 81 in accordance with the present invention a modification to the boost power supply circuit is provided in FIG. 4. The signal on line 78 of FIG. 3 indicative of the desired voltage to capacitance bank 18 is presented on a terminal 100. This signal is fed through a resistor 102 to a junction point 104. Junction point 104 is connected through a capacitor 106 to ground and through a resistor 108 to a junction point 110 between series connected resistors 84 and 86. By virtue of the signal on terminal 100, an additional voltage is introduced into the above described boost power supply circuit and as a result the signal at junction 82 is changed which causes the boost power supply switching controller circuit to increase or decrease the capacitor bank voltage as appropriate in order to keep the voltage at junction 82 at approximately 3 volts. The voltage at point 81 may vary from +66V when the voltage at terminal 100 is at a minimum, to approximately +55V when the voltage at terminal 100 is at the maximum.

Accordingly, it is seen that we have provided a system that will allow optimum performance with minimum power by adjusting the output power to the linear regulator in accordance with a temperature, in accordance with minimum desired voltage for a DELM transmission and in accordance with the aircraft requirements due to the specific installation.

Many changes and modifications will occur to those skilled in the art. For example, the output of the boost power supply may be altered in a variety of common ways to produce the resultant optimum voltage to the linear regulator. Accordingly, we do not wish to be limited to the specific structures described in connection with the description of the preferred embodiments but intend only to be limited by the following claims.

The embodiments of the invention in which an exclusive property or right is claimed are defined as follows:

1. In a pulsed transmitter system having a power source, a capacitance bank connected to the power source, a linear regulator connected to the capacitance bank and a transmitter connected to the linear regulator, the improvement comprising;

a temperature sensor positioned to sense the temperature of the capacitance bank and produce an output signal indicative thereof;

a processor to receive the signal from the temperature sensor and produce a modification signal in accordance with the temperature; and a circuit connected to the power source to receive the modification signal and to alter the output of the power source in accordance with the temperature sensed.

2. Apparatus according to claim 1 further including a voltage supply monitor to produce an output to said processor indicative of the voltage requirements so that said circuit receives a modification signal in accordance with voltage requirements and alters the output of the power source in accordance therewith.

3. Apparatus according to claim 1 further including a pin interface module to produce an output to said processor indicative of the transmitter requirements so that said circuit receives a modification signal in accordance with the transmitter requirements and alters the output of the power source in accordance therewith.

4. Apparatus according to claim 2 further including a pin interface module to produce an output to said processor indicative of the transmitter requirements so that said circuit receives a modification signal in accordance with the transmitter requirements and alters the output of the power source in accordance therewith.

5. Apparatus according to claim 4 wherein the outputs of the temperature monitor, the voltage supply monitor and the pin interface module are independently presented to the processor so that the modification signal varies in accordance with temperature, voltage requirements and transmission requirements and said circuit alters the output of the power source in accordance therewith.

6. Apparatus according to claim 5 wherein the outputs from the temperature sensor and the voltage supply monitor are converted from analog to digital signals for presentation to the processor.

7. Apparatus according to claim 6 wherein the modification signal is converted from digital to analog for presentation to the circuit.

8. Apparatus according to claim 1 wherein the transmitter is capable of producing a burst of transmission for a DELM reply.

9. Apparatus according to claim 8 wherein the DELM reply may last for over 2000 microseconds.

10. Apparatus according to claim 9 wherein the voltage to the transmitter may be 40 volts.

11. Apparatus according to claim 3 wherein the pulsed transmitter system is mounted aboard an aircraft, and the transmitter requirements depend on the aircraft type.

12. The method of compensating radio frequency pulsed transmitters which transmit at high power levels for short periods of time and which include a source of voltage to supply energy to a capacitor bank which supplies the power to the transmitter comprising the steps of:

A) sensing the ambient temperature of the capacitance bank; and

B) adjusting the output of the source so as to increase the voltage to the capacitance bank when the sensed temperature is low and to decrease the voltage to the capacitance bank when the sensed temperature is high.

13. The method of claim 12 further including the step of:

C) sensing the voltage from the capacitance bank; and

D) adjusting the output of the source to decrease the voltage to the capacitance bank when the minimum voltage from the capacitance bank is higher than a predetermined value.

14. The method of claim 12 wherein the transmitter is mounted on an aircraft and further including the steps of:

E) sensing the type of aircraft on which the transmitter is mounted; and

F) adjusting the output of the source to increase the voltage to the capacitance bank when the aircraft is one requiring longer transmission times and to decrease the voltage to the capacitance bank when the aircraft is one requiring shorter transmission times.

15. The method of claim 13 wherein the transmitter is mounted on an aircraft and further including the steps of:

E) sensing the type of aircraft on which the transmitter is mounted; and

F) adjusting the output of the source to increase the voltage to the capacitance bank when the aircraft is one requiring longer transmission times and to decrease the voltage to the capacitance bank when the aircraft is one requiring shorter transmission times.

* * * * *